United States Patent
Gluskin et al.

(10) Patent No.: US 10,062,486 B1
(45) Date of Patent: Aug. 28, 2018

(54) HIGH PERFORMANCE SUPERCONDUCTING UNDULATOR

(71) Applicant: Energy, United States Department of, Washington, DC (US)

(72) Inventors: Efim Gluskin, Darien, IL (US); Charles L. Doose, Clarendon Hills, IL (US); Matthew Kasa, New Lenox, IL (US); Joel D. Fuerst, Glen Ellyn, IL (US); Yury Ivanyushenkov, Darien, IL (US)

(73) Assignee: U.S. Department of Energy, Washington, DC (US)

( * ) Notice: Subject to any disclaimer, the term of this patent is extended or adjusted under 35 U.S.C. 154(b) by 0 days.

(21) Appl. No.: 15/427,346

(22) Filed: Feb. 8, 2017

(51) Int. Cl.
| | |
|---|---|
| H01H 1/00 | (2006.01) |
| H01F 6/06 | (2006.01) |
| H01F 27/24 | (2006.01) |
| H01S 3/09 | (2006.01) |
| H05H 7/04 | (2006.01) |

(52) U.S. Cl.
CPC .............. H01F 6/06 (2013.01); H01F 27/24 (2013.01); H01S 3/0903 (2013.01); H05H 7/04 (2013.01)

(58) Field of Classification Search
CPC ....... H01F 6/06; H05H 7/04; H05H 2007/048
USPC .......................................................... 335/216
See application file for complete search history.

(56) References Cited

U.S. PATENT DOCUMENTS

| | | | | |
|---|---|---|---|---|
| 4,977,384 A * | 12/1990 | Tatchyn | ................ | H01F 7/0278 315/5.35 |
| 5,014,028 A * | 5/1991 | Leupold | ................ | H01F 7/0278 315/3.5 |
| 5,019,863 A * | 5/1991 | Quimby | ................ | H01F 7/0278 315/5.35 |
| 5,563,568 A * | 10/1996 | Sasaki | ................... | H01F 7/0278 315/5.35 |
| 6,858,998 B1 * | 2/2005 | Shenoy | ................. | H05H 13/04 315/501 |
| 9,823,571 B2 * | 11/2017 | Patra | ................... | G03F 7/70025 |
| 2011/0172104 A1 * | 7/2011 | Moser | ..................... | H05H 7/04 505/150 |
| 2013/0099881 A1 * | 4/2013 | Deyhim | ............... | H01F 41/048 335/216 |
| 2013/0105421 A1 * | 5/2013 | Deyhim | .................. | H05H 7/04 211/26 |
| 2013/0130914 A1 * | 5/2013 | Boffo | ..................... | G21K 1/093 505/211 |
| 2014/0301415 A1 * | 10/2014 | Harrison | ................ | H01S 1/005 372/2 |

(Continued)

Primary Examiner — Shawki S Ismail
Assistant Examiner — Lisa Homza
(74) Attorney, Agent, or Firm — Karen L. Blouin; Michael J. Dobbs; Brian J. Lally

(57) ABSTRACT

A high performance superconducting undulator magnet is provided. The superconducting undulator magnet includes inset grooves in which magnetic poles are attached. The superconducting undulator magnet also includes clips for use in winding. The superconducting wire is wound such that the each revolution of the wire has a precise position within each of the grooves, the precise position being repeated in each groove. The superconducting undulator magnet provided will have a mechanical precision to preserve uniformity of the magnetic pole width and coil grooves. The undulator system provides uniformity of the undulator gap.

14 Claims, 5 Drawing Sheets

(56) References Cited

U.S. PATENT DOCUMENTS

2015/0323874 A1* 11/2015 Saenger ............... G02B 5/3083
                                                    355/71
2017/0184975 A1*  6/2017 Nikipelov ........... G03F 7/70025
2017/0293154 A1* 10/2017 Patra .................... G02B 27/283

* cited by examiner

US 10,062,486 B1

HIGH PERFORMANCE SUPERCONDUCTING UNDULATOR

GOVERNMENT INTERESTS

The United States Government has rights in this invention pursuant to Contract No. DE-AC02-06CH11357, between the U.S. Department of Energy (DOE) and UChicago Argonne LLC.

FIELD OF THE INVENTION

The present invention relates to a superconducting undulator with highly controlled uniformity of the magnetic field in order to minimize phase errors.

BACKGROUND OF THE INVENTION

An undulator is a magnetic device and it is usually part of a larger installation such as a storage ring- or free electron laser-based radiation source. An undulator is typically used for creating photon radiation for various investigations in a multitude of scientific areas. It can also be used for the manipulation of charged particle beam properties together with, or without, external radiation sources. The undulator consists of a periodic structure of dipole magnets which causes the static magnetic field to alternate along the length of the undulator. Due to the change of direction of the essentially sinusoidal magnetic field (up-down-up-down) the electrons passing through the undulator will start to have a wavy trajectory or undulate. While undulating, high energy electrons emit highly directed, quasi-monochromatic radiation.

Standard hybrid permanent magnet undulators in order to achieve high performance levels require careful individual magnet sorting prior to undulator assembly. After assembly, the undulator undergoes a thorough detailed magnetic characterization/measurement at all working gaps. The magnetic tuning process follows the magnetic measurements, and the magnetic field is tuned by using multiple shims of different sizes at multiple locations of undulator magnetic arrays. The tuning process is complete when the quality of the undulator magnetic field meets the requirements of a specific radiation source.

One main advantage of a Superconducting Undulator (SCU) is that the electric current that creates the magnetic field is the same in each coil pack-dipole along the length of the device. If coil packs are geometrically and electrically identical then the generated undulator field will be close to ideal. Therefore there is a need to fabricate the magnet structure with maximum mechanical precision to preserve uniformity of the magnetic pole width and coil grooves for the superconducting wire.

Another important advantage of an SCU is that one can set and maintain precisely the uniformity of the magnetic gap of the undulator which is not changed during the device operation. The uniformity of the undulator gap is one of the dominant factors in the reduction of phase errors of the device.

The installation of magnetic-type shims inside SCU cryostats after undulator installation and magnetic field measurements is very time consuming and impractical. And it becomes unnecessary if the undulator is built with the required precision. Some other integrated magnetic field errors can be corrected by having multiple built-around undulator correctors.

SUMMARY OF THE INVENTION

According to one aspect of the invention, a magnet for a superconducting undulator has a machined core. The machined core has an outer surface including a gap surface and a second surface opposed to the gap surface. Several inset grooves are formed in the gap surface. A magnetic pole is removeably attached in each of the grooves. Several spacers are removeably attached to at least a portion of the outer surface and are in alignment with respective magnetic poles. Many winding grooves are formed between adjacent spacers and magnetic poles. A superconducting wire is wound in the winding grooves. The wire is wound in opposing directions in adjacent winding grooves for a predetermined number of revolutions. Several clips are attached to the top surface of the machined core. The clips have at least one leg and the wire is wound around at least a portion of one of the legs.

According to another aspect of the invention, an undulator system has at least one external clamp. The external clamp has a top and bottom member which are spaced a predetermined distance from each other. A first and second magnetic core are spaced from each other and each of the top surfaces of the magnetic cores are adjacent the top or bottom member of the clamp. At least one gap spacer is placed close to the magnetic gap and in alignment with the external clamp. The magnetic gap has a precision of approximately 25 micrometers per 100 mm length.

BRIEF DESCRIPTION OF THE DRAWINGS

Further aspects of the invention and their advantages can be discerned in the following detailed description, in which like characters denote like parts and in which.

DETAILED DESCRIPTION OF THE INVENTION

The superconducting undulator (SCU) described in this invention may be used in a storage ring or free electron laser-based radiation source. SCUs are employed at synchrotron light sources for generation of high energy photons using high magnetic fields. Undulators are brighter radiation sources than superconducting bending magnets and superconducting wigglers. However the magnetic field errors of undulators need to be kept very small to achieve high flux of radiation harmonics. Accordingly, the precise fabrication of a superconducting magnet is required.

In one embodiment, the undulator field of an SCU is generated by energizing coils formed from superconductor wires 112 in grooves 110 that are precisely machined on a machined core 102 made of a magnetic or non-magnetic material. The quality of the magnetic field, i.e. repeatability of the peak magnetic field from one undulator period to another along the full device, strongly depends on the precision of grooves 110, quality of winding, and the uniformity of the magnetic gap.

Figure 1:
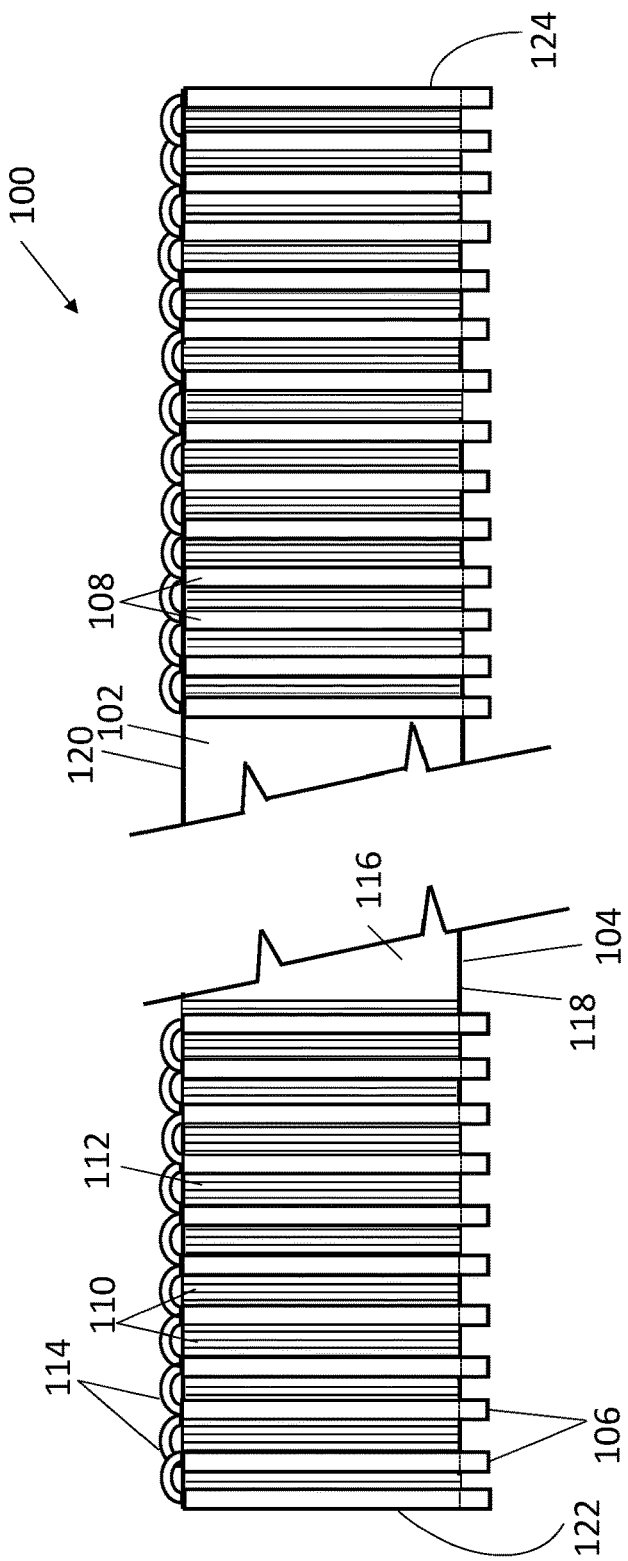
FIG. 1 is a side view of the magnet for a SCU according to the invention.
Figure 2:
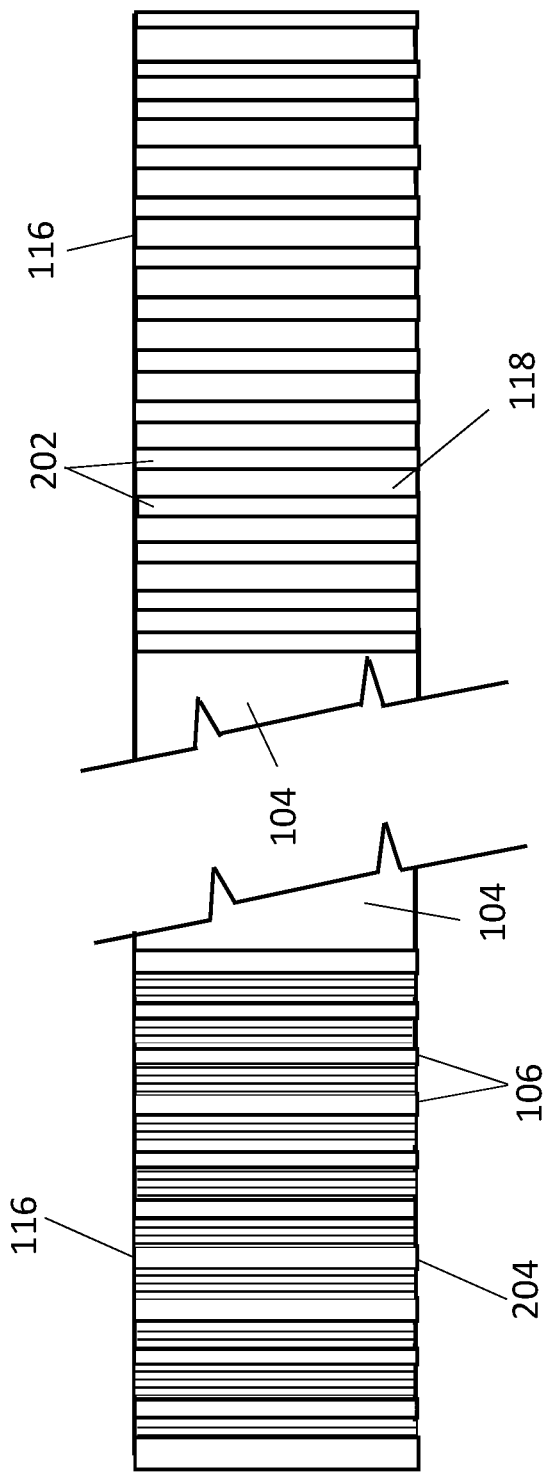
FIG. 2a is a plan view of the bottom of the magnet for a SCU with superconducting wire wound in grooves.
FIG. 2b is a plan view of the bottom of the magnet for a SCU without superconducting wire wound in grooves.

FIG. 1 is a magnet 100 for use in the SCU. The magnet has a machined core 102 that may be made of a magnetic or non-magnetic material or any other material which provides acceptable results. The machined core 102 may have a racetrack shape or any shape which provides acceptable results. The machined core 102 has an outer surface 118, a portion of which is a bottom surface or gap surface (faces the beam) 104 that is flat and polished smooth. The machined core 102 can be machined precisely with a flatness on the gap surface 104 approximately 50 micrometers over the whole length of the gap surface 104. The gap surface of the machined core 104 is polished to prevent damage to the insulation of the superconducting wire 112. This polished gap surface 104 forms the base of the winding grooves 110. A first and a second connecting side 116, 204 (see FIG. 2) extend between the gap surface 104 and a second surface 120 which is opposed to the gap surface 104. The machined core 102 has a width and length that is application specific.

Several inset grooves 202 (see FIG. 2) extend inwardly from the gap surface 104. Each of the inset grooves 202 is substantially rectangular in shape and spaced at a regular interval from adjacent inset grooves 202. To avoid an accumulated error in the pole location, each inset groove 202 may be machined from the same initial reference plane. The inset grooves 202 extend inwardly into the machined core 102 to a predetermined depth. The predetermined depth is one at which when a magnetic pole 106 is seated in each of the inset grooves 202, at least a portion of the magnetic pole 106 extends outwardly past the outer surface of the machined core 118. Each magnet 106 extends to a distance that produces an acceptable result. There are no inset grooves 202 on any other portion of the outer surface of the machined core 118, solely on the gap surface 104.

The multiple magnetic poles 106 are precisely grinded, polished and sized to removeably fit in the respective inset grooves 202 and attach to the machined core 102. The flatness that is typically achieved after the final grinding process is approximately 10 micrometers RMS. The magnetic poles 106 have a length such that each of the magnetic poles 106 extends across at least the full width of the respective inset groove 202. In one embodiment a portion of the magnetic poles 106 have end tabs and are longer than the width of the respective inset groove 202. In one embodiment, the magnetic poles 106 may be removeably attached to the machined core 102 with #1-64 screws. Alternate embodiments may have the magnetic poles 106 attached to the machined core 102 by other means.

As illustrated in FIG. 1, spacers 108 are removably attached to at least a portion of the outer surface 118. The spacers 108 may be slightly narrower than the magnetic poles 106 to allow for less restrictive tolerances during the machining and fabrication process. The spacers 108 are preferably not formed from metal but are instead formed from a material that is yielding and soft enough that it will not damage the insulation of the wire 112 when the wire 112 is wound around the core 102. In one embodiment the spacers 108 are formed of G10 which is a glass woven fabric impregnated with an epoxy resin binder. Alternate embodiments may have spacers 108 formed of materials other than G10 such that the spacers 108 do not damage the wire 112, and together with the magnets 106, form a winding groove 110. Preferably the material used for the spacers 108 is a nonconductor such as G10.

In one embodiment each of the spacers 108 is removably attached to either the first or second connecting side 116, 204 and at least a portion of the top surface 120. The spacers 108 are positioned such that pairs of spacers 108 on both sides of the core 102 are in alignment with a respective magnetic pole 106 on the gap surface 104. Continuous winding grooves 110 are formed in between adjacent spacers 108 and adjacent magnetic poles 106. For each winding groove 110, spacers 108 are in alignment with a respective magnetic pole 106; there should be two spacers for each of the magnetic poles. For example if the number of magnetic poles is x, the number of spacers is 2x. The spacer 108 may be attached to the machined core 102 with spring pins or any other means that produces acceptable results. The winding groove 110 dimensions are verified to approximately 15 micrometers RMS, and the periodicity is measured to verify there are no accumulated errors, typically approximately 10 micrometers RMS.

The number of winding grooves 110 is determined by the number and width of magnetic poles 106 and spacers 108 as well as the length of the machined core 102. Each of the winding grooves 110 is formed adjacent the body of the machined core 102. The size of each of the winding grooves 110 is determined by the specific application in addition to the placement of the magnetic poles 106, spacers 108, size of the wire 112 and the winding scheme that is to be used.

Superconducting wire 112 is wound around the machined core 102. In the illustrated embodiment the wire 112 is an NbTi wire. Alternate embodiments may use an $Nb_3Sn$ wire. The diameter of the superconducting wire 112 is application specific.

The superconducting wire 112 must be wound around the machined core 102 in an alternating fashion with the wire 112 wound in opposing directions in adjacent grooves 110. The superconducting wire 112 is wound such that the each revolution of the wire has a precise position within each of the grooves 110, the precise position being repeated in each groove 110. Typical prior art undulators were wound by first winding all of the odd grooves in one direction and then changing direction of the conductor followed by winding all of the even grooves.

Figure 3:
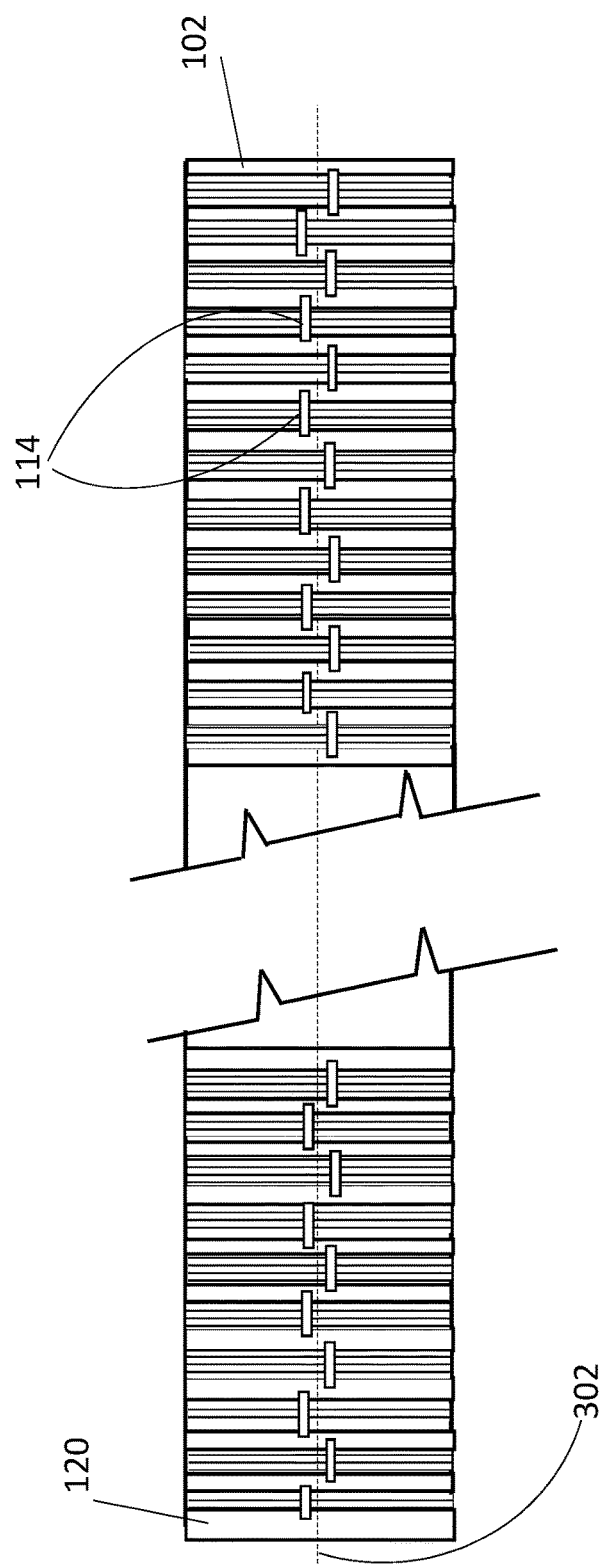
FIG. 3 is a top view of the magnet for a SCU.

The method of winding used in the instant invention uses clips 114 that are spaced within close proximity of the midline 302 (See FIG. 3) of the top surface 120. In the illustrated embodiment the clips 114 are approximately 2 mm from the midline 302. In addition, as illustrated in FIG. 3, the clips 114 alternate on either side of the midline 302. Alternate embodiments may have clips 114 in other positions such that the winding process can be accomplished.

In the illustrated embodiment the wire 112 is wound in each groove 110 fifty-three (53) times. The number of revolutions is determined by the undulator field desired. Alternate embodiments may have wire 112 wound around the core 102 a different number of times.

Figure 4:
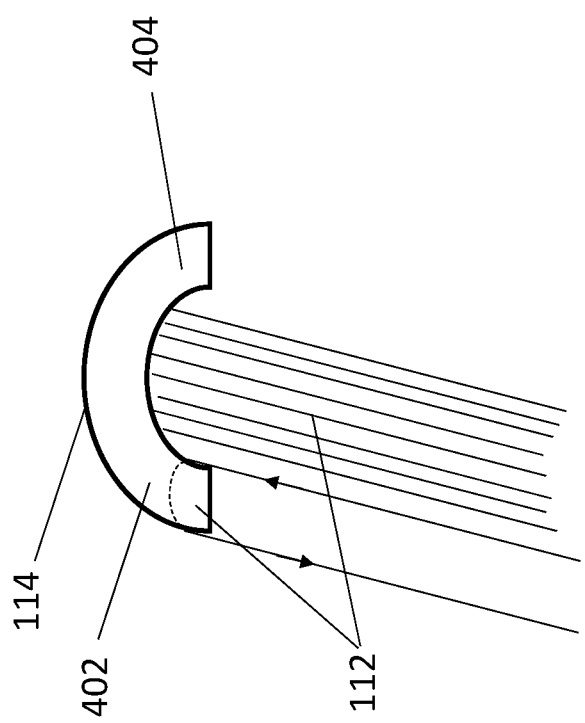
FIG. 4 is a magnified view of a clip and superconducting wire according to the invention; and, FIG. 5 is a front view of an undulator system with clamps according to the invention.
Figure 5:
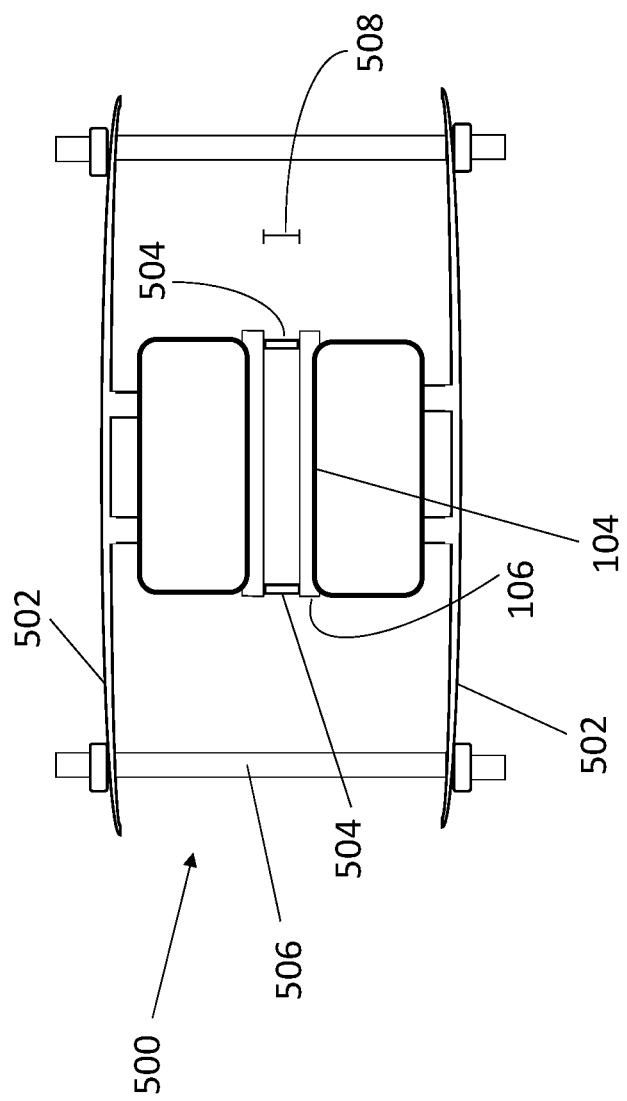

After the wire 112 is wound 53 times in the first groove, the wire 112 is transitioned to the adjacent groove 110 using one of the clips 114 to make a 180° turn. In the illustrated embodiment this is accomplished by winding the wire 112 around at least a portion of one of the legs of the clip 402, 404. The adjacent groove 110 is then wound in the opposite direction. Clips 114 are inserting in machined holes in close proximity to the midline 302 on the top surface of the core 102 one by one after completing the winding process in each groove 110. Each clip 114 has at least one leg 402, 404. The clips 114 may be secured in any manner that provides acceptable results. In the illustrated embodiment each clip 114 has two legs 402, 404 (See FIG. 4) for increased stability. The clip 114 is attached to the machined core 102 by whatever means produces the desired stability for the winding.

In the illustrated embodiment the winding is accomplished in the following fashion. Starting at the top of the machined core 102 in the groove 110 closest to the leading edge 122, the wire is wound a predetermined number of revolutions in one of the two directions—After the predetermined amount of revolutions is accomplished, the wire 112 is wound around at least a portion one of the clip legs 402, 404 such that the direction of the wire 112 is reversed. The wire 112 is then wound in the adjacent groove 110 (moving from the leading edge 122 towards the trailing edge 124) in the opposite direction a predetermined amount of times. For example, if the wire 112 was wound in a clockwise direction in the first groove 110, the wire 112 is wound in a counter-clockwise direction in the adjacent groove 110. The wire 112 is wound in the second groove 110 the predetermined number of times. A clip 114 is inserted into the core 102 and the wire 112 is wound around at least a portion of one of the clip legs 402, 404 such that the direction of the wire is reversed. The wire 112 is then wound in the adjacent groove 110 in the opposite direction from the previous groove 110. In that manner, the wire 112 is wound in all of the grooves 110; the wire 112 is wound in successive grooves 110 starting in the groove 110 nearest the leading edge 122 and finishing in the groove 110 nearest the trailing edge 124. In the illustrated embodiment, the wire 112 is wound in the majority of the grooves 110 fifty three (53) times. In the illustrated embodiment the final three grooves 110 are wound less than fifty three (53) times. Alternate embodiments may have a predetermined number of revolutions different than fifty three (53). Extreme precision in the winding is critical. In the illustrated embodiment a semi-custom winding machine is used to wind the wire 112 around the machined core 102. After winding the machined core 102 may be impregnated with epoxy resin.

To prevent any possible bowing that may occur and cause the magnetic gap 508 to be larger once the cores 100 are assembled, external clamp assemblies 502 may be added to the core assembly 500. In one embodiment external clamps assemblies 502 were added and at least two gap spacers 504 were extended between the magnetic poles 106 or machined core 102. The external clamps assemblies 502 may made of titanium or any other material that provides acceptable results. Stainless steel threaded rods 506 are installed onto the clamp assemblies 502 at spacer locations 504 along the length of the assembled cores 100. Alternate embodiments may have external clamp assemblies 502 and threaded rods 506 formed of different materials. In one embodiment there are eight gap spacer 504 locations distributed along the length of the device 500. Alternate embodiments may have more than or less than eight gap spacers 504. Gap spacers 504 maintain a specified gap and extended from the gap surface 104 to prevent any distortion of the longer poles 106 once the external clamp assemblies 502 are torqued. In this arrangement, the magnetic gap 508 is defined by the precision of the gap spacers 504.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

All publications and patent documents cited in this application are incorporated by reference in their entirety for all purposes to the same extent as if each individual publication or patent document were so individually denoted.

Any element in a claim that does not explicitly state "means for" performing a specified function, or "step for" performing a specific function, is not to be interpreted as a "means" or "step" clause as specified in 35 U.S.C.§ 112, ¶ 6. In particular, the use of "step of" in the claims herein is not intended to invoke the provisions of 35 U.S.C.§ 112, ¶ 6.

The invention claimed is:

1. A magnet for a superconducting undulator comprising:
   a machined core, the machined core having an outer surface, the outer surface including a gap surface and a second surface opposed to the gap surface, the second surface having a midline, a plurality of inset grooves formed on the gap surface;
   a plurality of magnetic poles, each of the plurality of magnetic poles disposed in a respective inset groove and removably attached to the machined core, a plurality of spacers, each of the plurality of spacers being in alignment with a respective one of the plurality of magnetic poles and removably attached to at least a portion of the outer surface, a plurality of winding grooves formed between adjacent ones of the plurality of spacers and plurality of magnetic poles;
   a superconducting wire wound a predetermined number of revolutions in each of said plurality of winding grooves such that the wire is wound in opposing directions in adjacent winding grooves, a plurality of clips removeably attached to the top surface in close proximity to the midline, each of the plurality of clips having at least one leg, the wire being wound around at least a portion of each of the at least one leg.

2. The magnet of claim 1, wherein the gap surface is polished.

3. The magnet of claim 2, the gap surface has a plurality of surface points, each of the plurality of surface points being within 50 micrometers of the other plurality of surface points.

4. The magnet of claim 1, wherein upon winding, the wire has a plurality of positions in each of the plurality of winding grooves, the plurality of positions being approximately identical in each of the plurality of winding grooves.

5. The magnet of claim 1, wherein the magnetic poles are polished.

6. The magnet of claim 1, wherein the magnetic poles are attached via screws.

7. The magnet of claim 1, wherein the spacers are made of G10.

8. The magnet of claim 1, wherein the wire is an insulated superconducting wire.

9. The magnet of claim 8, wherein the wire is NbTi.

10. The magnet of claim 8, wherein the wire is $Nb_3Sn$.

11. The magnet of claim 1, wherein each of the plurality of clips has two legs.

12. The magnet of claim 1, wherein the magnet has a period of approximately 1 to 3 centimeters.

13. The magnet of claim 1, wherein the magnetic poles are machined of low carbon steel.

14. The magnet of claim 1, wherein the machined core is machined of a magnetic or non-magnetic material.

* * * * *